US011521052B2

(12) United States Patent
Dasgupta et al.

(10) Patent No.: US 11,521,052 B2
(45) Date of Patent: Dec. 6, 2022

(54) HARDWARE AND NEURAL ARCHITECTURE CO-SEARCH

(71) Applicant: Edgecortix Pte. Ltd., Singapore (SG)

(72) Inventors: Sakyasingha Dasgupta, Tokyo (JP); Weiwen Jiang, Notre Dame, IN (US); Yiyu Shi, Norte Dame, IN (US)

(73) Assignee: EDGECORTIX PTE. LTD., Singapore (SG)

(*) Notice: Subject to any disclaimer, the term of this patent is extended or adjusted under 35 U.S.C. 154(b) by 0 days.

(21) Appl. No.: 17/362,997

(22) Filed: Jun. 30, 2021

(65) Prior Publication Data

US 2022/0019880 A1    Jan. 20, 2022

(30) Foreign Application Priority Data

Jul. 14, 2020  (JP) ............... JP2020-120906

(51) Int. Cl.
*G06N 3/063*  (2006.01)
*G06N 3/08*  (2006.01)
(Continued)

(52) U.S. Cl.
CPC ........... *G06N 3/063* (2013.01); *G06N 3/0445* (2013.01); *G06N 3/0454* (2013.01); *G06N 3/08* (2013.01); *G06N 20/00* (2019.01)

(58) Field of Classification Search
CPC ...... G06N 3/063; G06N 20/00; G06N 3/0445; G06N 3/0454; G06N 3/08; G06N 7/005; G06N 3/04
See application file for complete search history.

(56) References Cited

U.S. PATENT DOCUMENTS

| 2019/0251439 | A1 | 8/2019 | Zoph et al. |
| 2020/0104715 | A1* | 4/2020 | Denolf .................. G06N 3/006 |
| 2020/0143670 | A1 | 5/2020 | Kitani et al. |

FOREIGN PATENT DOCUMENTS

| JP | 2019533257 A | 11/2019 |
| WO | 2018198823 A1 | 11/2018 |

OTHER PUBLICATIONS

Jiang et al., "Hardware/Software Co-Exploration of Neural Architectures", Jul. 6, 2019, arXiv:1907.04650v2 (Year: 2019).*

(Continued)

*Primary Examiner* — Michael J Huntley
*Assistant Examiner* — Sehwan Kim
(74) *Attorney, Agent, or Firm* — Hauptman Ham, LLP

(57) ABSTRACT

Hardware and neural architecture co-search may be performed by operations including obtaining a specification of a function and a plurality of hardware design parameters. The hardware design parameters include a memory capacity, a number of computational resources, a communication bandwidth, and a template configuration for performing neural architecture inference. The operations further include determining, for each neural architecture among a plurality of neural architectures, an overall latency of performance of inference of the neural architecture by an accelerator within the hardware design parameters. Each neural architecture having been trained to perform the function with an accuracy. The operations further include selecting, from among the plurality of neural architectures, a neural architecture based on the overall latency and the accuracy.

20 Claims, 9 Drawing Sheets

(51) Int. Cl.
*G06N 3/04* (2006.01)
*G06N 20/00* (2019.01)

(56) References Cited

OTHER PUBLICATIONS

Chen, Yukang, et al. "Detnas: Neural architecture search on object detection." arXiv preprint arXiv:1903.10979 1.2 (2019): 4-1. (Year: 2019).*

Yang, Yang, et al. "Fpnet: Customized convolutional neural network for fpga platforms." 2019 International Conference on Field-Programmable Technology (ICFPT). IEEE, 2019. (Year: 2019).*

Jiang, Weiwen, et al. "Accuracy vs. efficiency: Achieving both through fpga-implementation aware neural architecture search." Proceedings of the 56th Annual Design Automation Conference 2019. 2019. (Year: 2019).*

Oh, Sangyun, et al. "RRNet: Repetition-Reduction Network for Energy Efficient Depth Estimation." IEEE Access 8 (2020): 106097-106108. (Year: 2020).*

Umuroglu, Yaman, et al. "Finn: A framework for fast, scalable binarized neural network inference." Proceedings of the 2017 ACM/SIGDA International Symposium on Field-Programmable Gate Arrays. 2017. (Year: 2017).*

Liu, Zechun, et al. "A Gradient-based Architecture HyperParameter Optimization Approach." (2019). (Year: 2019).*

Zhang, Chen, et al. "Optimizing fpga-based accelerator design for deep convolutional neural networks." Proceedings of the 2015 ACM/SIGDA international symposium on field-programmable gate arrays. 2015. (Year: 2015).*

Shen, Yongming, Michael Ferdman, and Peter Milder. "Maximizing CNN accelerator efficiency through resource partitioning." 2017 ACM/IEEE 44th Annual International Symposium on Computer Architecture (ISCA). IEEE, 2017. (Year: 2017).*

Baker, Bowen, et al. "Designing neural network architectures using reinforcement learning." arXiv preprint arXiv:1611.02167 (2017). (Year: 2017).*

Tan, Mingxing, et al. "Mnasnet: Platform-aware neural architecture search for mobile." Proceedings of the IEEE/CVF Conference on Computer Vision and Pattern Recognition. 2019. (Year: 2019).*

Weiwen Jiang et al."Standing on the Shoulders of Giants: Hardware and Neural Architecture Co-Search with Hot Start", [online], arXiv:2007.09087v1, Jul. 17, 2020, pp. 1-13, URL: https://arxiv.org/pdf/2007.09087.pdf, 13pp.

Weiwen Jiang et al."Hardware/Software Co-Exploration of Neural Architectures", [online], arXiv:1907.04650v2, Jan. 11, 2020, pp. 1-10, URL: https://arxiv.org/pdf/1907.04650.pdf, 10pp.

Martin Wistuba et al., "A Survey on Neural Architecture Search", [online], arXiv:1905.01392v2, Jun. 18, 2019, pp. 1-53, URL: https://arxiv.org/pdf/1905.01392.pdf, 53pp.

Office Action in JP Application No. 2020-120906, dated Jan. 19, 2021. 7pp.

Notice of Allowance in JP Application No. 2020-120906, dated Apr. 13, 2021. 5pp.

* cited by examiner

HARDWARE AND NEURAL ARCHITECTURE CO-SEARCH

RELATED APPLICATIONS

The present application claims priority to Japanese Patent Application No. 2020-120906 filed Jul. 14, 2020, the disclosure of which is hereby incorporated by reference herein in its entirety.

BACKGROUND

Technical Field

The present invention relates to hardware and neural architecture co-search. More specifically, the present invention relates to hardware and neural architecture co-search from pre-trained neural architectures.

Background

The success of Deep Neural Networks (DNN), has propelled Artificial Intelligence (AI) in entering every aspect of our lives and is being widely employed for diverse applications on different types of hardware. Neural Architecture Search (NAS), a successful product of Automatic Machine Learning (AutoML), has paved the way from a given dataset to a neural architecture with state-of-the-art accuracy.

Recently, neural architecture and hardware design (abbr. architecture-hardware) co-search frameworks have been proposed to bridge the gap between neural architecture and hardware design. These frameworks have demonstrated promising results in generating high-accuracy and low-cost systems. However, their search efficiency is low: existing co-search frameworks commonly take hundreds of GPU hours per target hardware. This may become the bottleneck in many emerging applications where fast turn-around or short time-to-market is desired. On the other hand, it has already been shown that the carbon footprint (pounds of $CO_2$) of NAS for one neural network model is nearly equivalent to five times the lifetime emissions of an automobile. In this work, we are revisiting the default setting used by existing co-search frameworks, where: the exploration always starts from scratch (i.e., cold start), which results in large search time and low efficiency.

SUMMARY

According to an aspect of the present invention, provided is a computer program including instructions that are executable by a computer to cause the computer to perform operations for hardware and neural architecture co-search. The operations include obtaining a specification of a function and a plurality of hardware design parameters. The hardware design parameters include a memory capacity, a number of computational resources, a communication bandwidth, and a template configuration for performing neural architecture inference. The operations further include determining, for each neural architecture among a plurality of neural architectures, an overall latency of performance of inference of the neural architecture by an accelerator within the hardware design parameters. Each neural architecture having been trained to perform the function with an accuracy. The operations further include selecting, from among the plurality of neural architectures, a neural architecture based on the overall latency and the accuracy.

This aspect may also include the method performed by the processor executing the instructions of the computer program, and an apparatus that performs the method. The apparatus may include an obtaining section configured to obtain a specification of a function and a plurality of hardware design parameters, a determining section configured to an overall latency of performance of inference of the neural architecture by an accelerator, and a selecting section configured to select, from among the plurality of neural architectures, a neural architecture based on the overall latency and the accuracy.

The summary clause does not necessarily describe all necessary features of the embodiments of the present invention. The present invention may also be a sub-combination of the features described above.

DESCRIPTION OF EXEMPLARY EMBODIMENTS

Hereinafter, example embodiments of the present invention will be described. The example embodiments shall not limit the invention according to the claims, and the combinations of the features described in the embodiments are not necessarily essential to the invention.

To be able to use AI for enabling and accelerating different application, the neural architecture may be designed in a way that the design specifications are met on target hardware, such as real-time constraints for edge devices, low power budgets for IoT devices, etc.

Based on all the foregoing definitions, the architecture-hardware co-search optimization problem may be defined as follows: given a model zoo M, a specific FPGA FP, the accelerator design D of neural network model A in M on FP, a target timing constraint T, and the baseline accuracy acc baseline we are going to determine:

S: selection of architectures from zoo M, denoted as $A_0$;
P, C, X, Q: tuning architecture hyper-parameters of $A_0$;
H: tuning hardware design hyper-parameters on $D_0$.
such that a new architecture $A'_0$ with competitive accuracy over acc baseline can be identified, while $A'_0$ under hardware design $D'_0$ can meet the timing constraint T.

Figure 1:
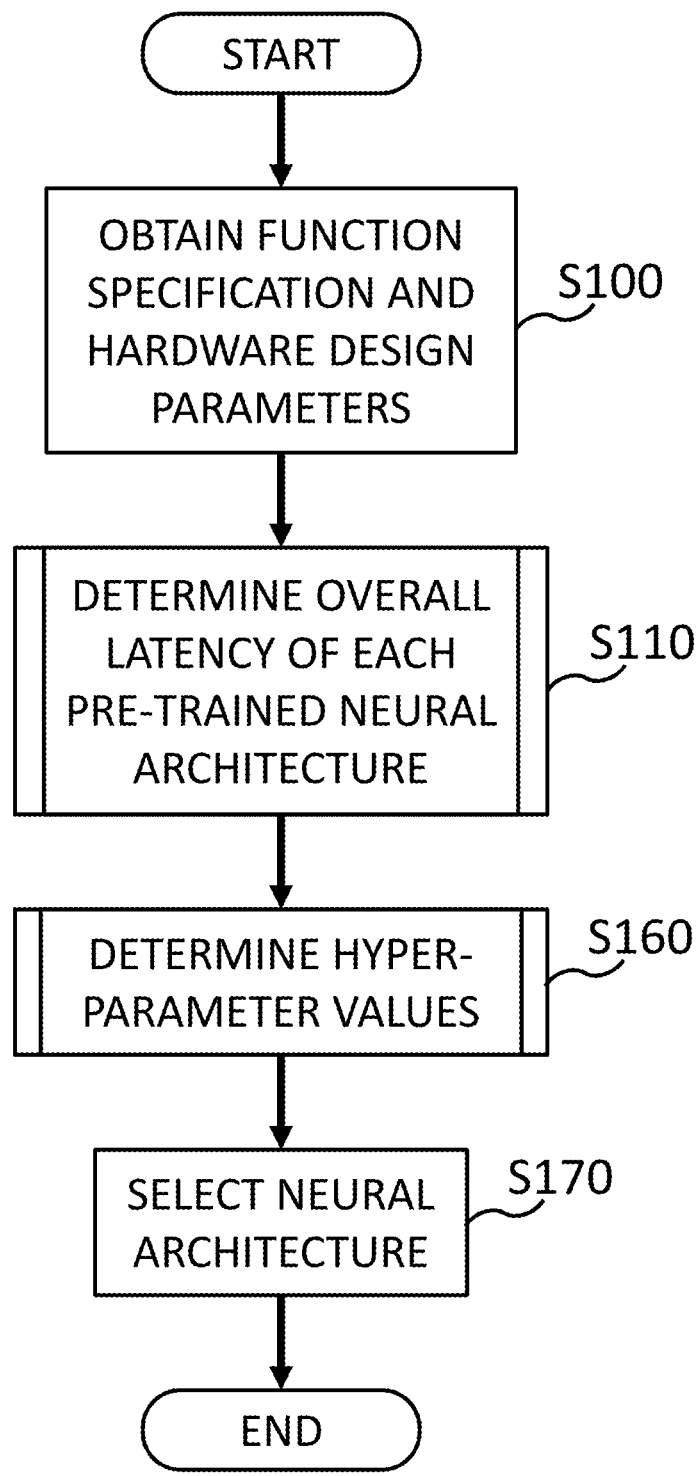
FIG. 1 shows an operational flow for hardware and neural architecture co-search, according to an embodiment of the present invention.

FIG. 1 shows an operational flow for hardware and neural architecture co-search, according to an embodiment of the present invention. The operational flow may provide a method for hardware and neural architecture co-search. The method may be performed by an apparatus including sections for performing certain operations, such as the apparatus shown in FIG. 11, which will be explained hereinafter.

At S100, an obtaining section obtains a specification of a function and a plurality of hardware design parameters. The function may be image processing applications, such as advanced driver-assistance systems (ADAS) for automobiles, medical diagnosis, etc., data classification, or any other function that may be performed by neural architecture inference. The hardware design parameters may include a memory capacity, a number of computational resources, a communication bandwidth, and a template configuration for performing neural architecture inference. In some embodiments, a specific FPGA chip may have been selected for use in performing inference for a particular application. The specific FPGA chip will have a memory capacity, a number of computational resources, and a communication bandwidth. For instance, a XILINX® ZCU102 board with a XCZU9EG chip is composed of 600K logic cells, 32.1 Mb on-chip buffers, and 2,520 DSPs. For data movement between on-chip and off-chip memory, there are 4 HP ports, each with a bandwidth of 128 bits.

At S110, a determining section determines, for each neural architecture among a plurality of neural architectures, each neural architecture having been trained to perform the function with an accuracy, an overall latency of performance of inference of the neural architecture by an accelerator within the hardware design parameters. The plurality of neural architectures may be referred to as a "model zoo." The model zoo will include neural architectures that have been pre-trained to perform the function of interest. The function for which each neural architecture in the model zoo has been trained may be generally or specifically applicable to the obtained function of interest. For example, if the obtained function of interest is pedestrian detection for ADAS, a neural architecture trained to specifically to perform pedestrian detection could certainly be included in the model zoo, but a neural architecture trained specifically to perform image-based medical diagnosis, or other such applications may also be included in the model zoo, because it generally performs feature recognition in image analysis.

Figure 2:
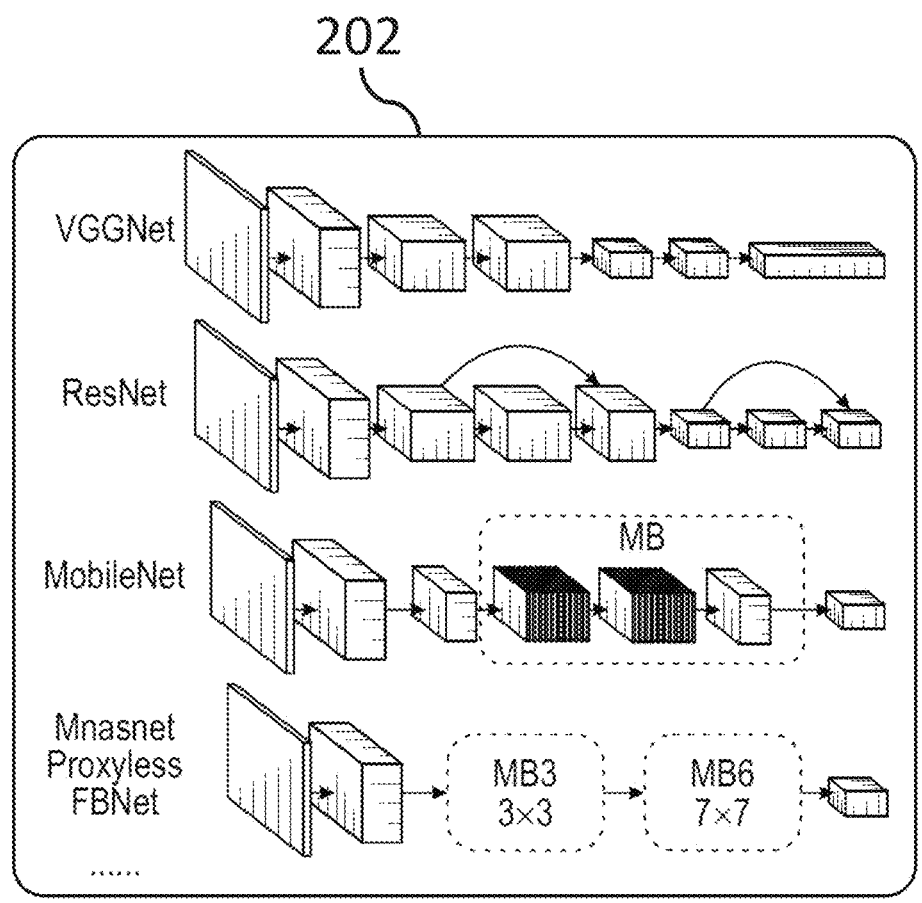
FIG. 2 shows a plurality of pre-trained neural architectures, according to an embodiment of the present invention.

FIG. 2 shows a plurality of pre-trained neural architectures in a model zoo 202, according to an embodiment of the present invention. A neural architecture A may be defined as A=(V, E, r, c, ch, o, f, para, acc), such that the neural architecture is composed of a set of nodes V representing the intermediate data (i.e., input and output feature maps), and a set of edges E⊆V×V representing the dependency between a pair of nodes. A node $v_i$ in V has three hyper-parameters: $r_i$, $c_i$, and $ch_i$ representing the number of rows, columns, and channels, respectively, of $v_i$. An edge $e_j \in E$ is associated with an operator $o_j$, such as conventional convolution, depthwise convolution, pooling, etc. $f_j$ represents the filter (i.e., weights) used in operator $o_j$, which is composed of a set of kernels. Each filter is associated with two hyper-parameters: $s(f_i)$, which indicates the size of the filter (e.g., 1×1, 3×3, etc.), and $p(f_i)$, which indicates a pattern applied to prune $f_i$. Both the size and the pattern of the filter can be modified during hardware and neural architecture co-search.

A pre-trained neural architecture may be referred to as a neural network model, and a model zoo M={$A_0$, $A_1$, ..., $A_{N-1}$} is composed of N neural network models. These neural network models can be manually designed by experts, like AlexNet, VGGNet, ResNet, automatically searched via neural architecture search, like MnasNet, ProxylessNas, FBNet, or transferred from neural network models for other datasets, like BiT. Existing model zoos, such as those from Open-source TORCHVISON, can be used. State-of-the-art pre-trained neural network models may be collected from suitable Open-sourced code repositories on GITHUB and added to the model zoo. This may result in significantly reduced cost of building the model zoo. Those having skill in the art will recognize other sources for model zoo creation upon reading this disclosure.

As will be described hereinafter, after all the foregoing hyper-parameters are determined, neural architecture A can be further trained on an application specific training data set, which may be a popular training data set, such as the ImageNet dataset or the CIFAR-10 dataset, to obtain the parameters and weights para(A). The test accuracy acc(A) on a hold-out training data set, which may be a portion of the training data set, can also be obtained.

Figure 3:
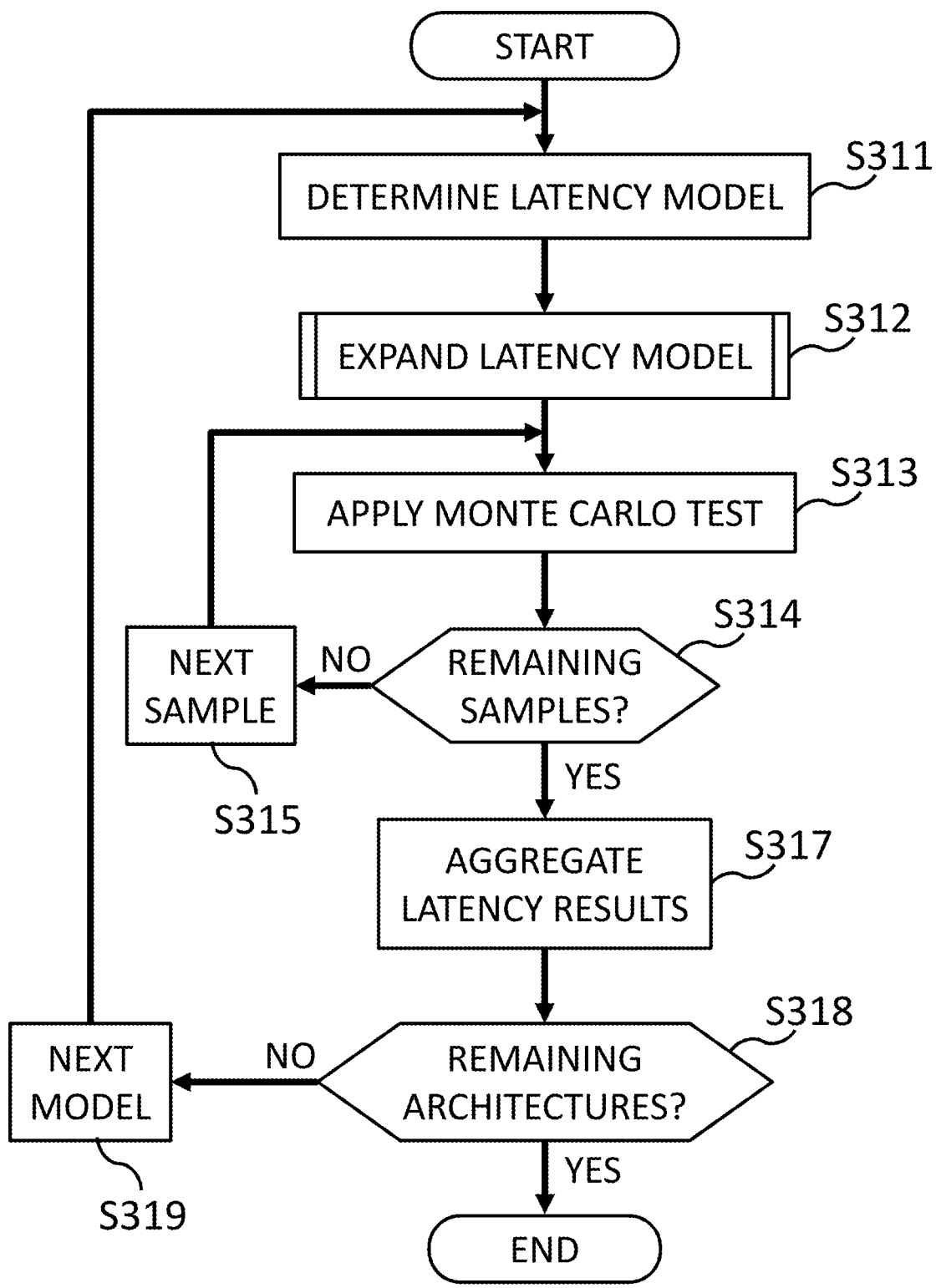
FIG. 3 shows an operational flow for determining an overall latency potential of a neural architecture, according to an embodiment of the present invention.

FIG. 3 shows an operational flow for determining an overall latency potential of a neural architecture, such as S110 in FIG. 1, according to an embodiment of the present invention. The operations within this operational flow may be performed by a determining section or a correspondingly named sub-section thereof. As described in FIG. 1, the function specification and the hardware design parameters are obtained prior to determining an overall latency of a neural architecture.

At S311, the determining section determines a latency model for a neural architecture. The overall latency of the performance of inference of each neural architecture varies with the hardware performing inference. Thus, in order to determine the overall latency, the determining section determines a latency model for performing inference within the hardware specifications. In other words, determining the overall latency may further include determining a latency model of a plurality of hyper-parameters to execute the performance of inference of the neural architecture by the accelerator while interfacing with an external memory storing activation data. Thus, the plurality of hyper-parameters of the latency model not only include the neural architecture hyper-parameters A, but also accelerator hyper-parameters D.

As a whole, the accelerator design may be defined as $D = \langle T_m, T_n, T_r, T_c, I_b, W_b, O_b \rangle$, where the loop tiling design is represented by $\langle T_m, T_n, T_r, T_c \rangle$ and the bandwidth allocation is represented by $\langle I_b, W_b, O_b \rangle$. Specifically, for an operator $o_k$ associated to a pair of nodes $v_i \rightarrow v_j$ in an architecture, $T_m$, $T_n$, $T_r$, and $T_c$ are the tiling parameters on output feature maps (OFM) channels $ch_j$, input feature maps (IFM) channels $ch_i$, rows $r_i$, and columns $c_i$; while $\langle I_b, W_b, O_b \rangle$ are the bandwidth allocated for moving IFM (i.e., $v_i$), OFM (i.e., $v_j$), and weights (i.e., $f_k$). For a design D and an architecture A, the latency of each operator, such as $o_k$, can be determined during hardware and neural architecture co-search. The summation of all operators will be the latency of A, denoted as lat(A).

Figure 4:
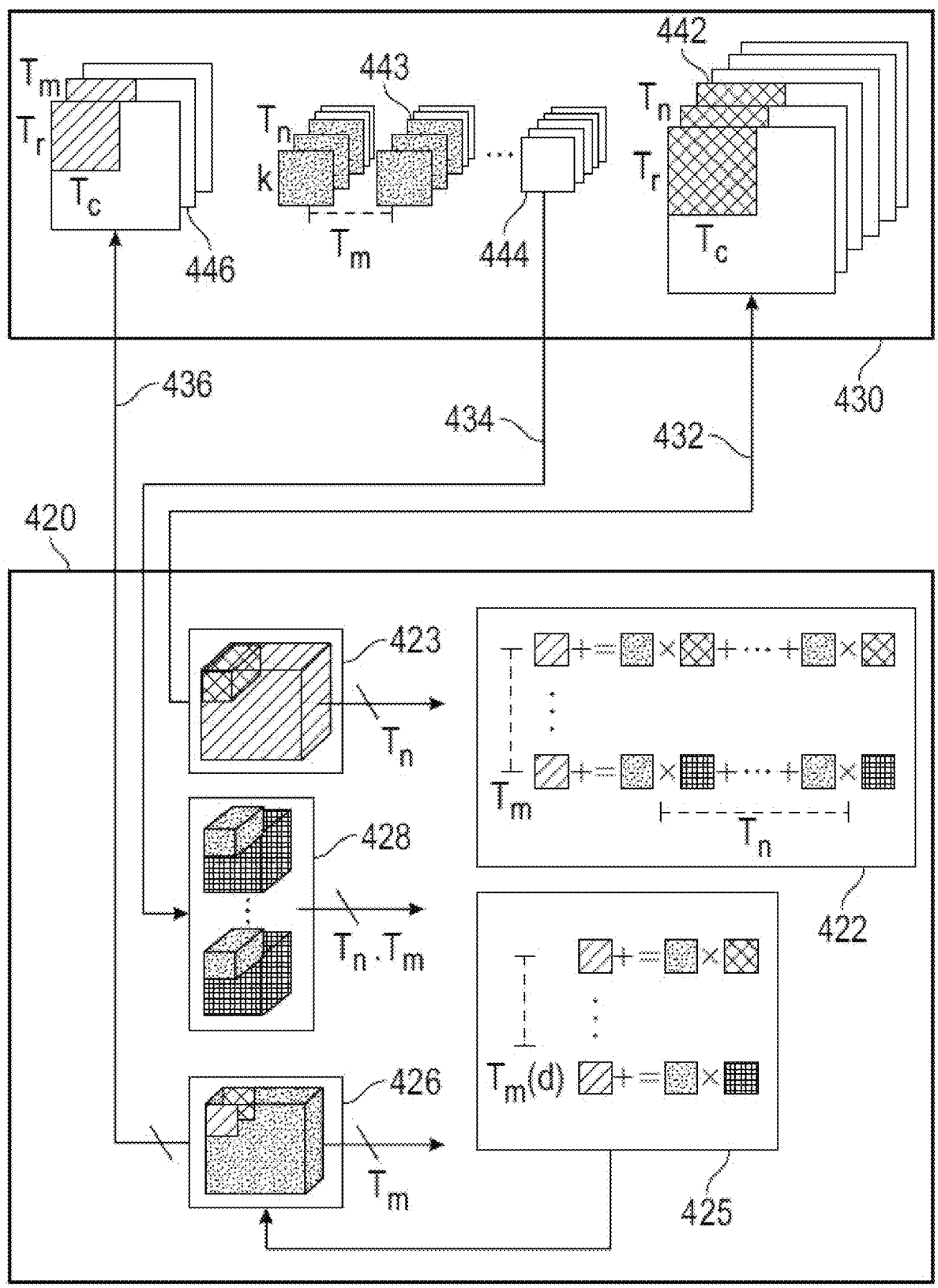
FIG. 4 shows a diagram of data flow through an accelerator performing inference of a neural architecture, according to an embodiment of the present invention.

FIG. 4 shows a diagram of data flow through an accelerator 420 performing inference of a neural architecture, according to an embodiment of the present invention. Accelerator 420 includes on-chip memories of input feature map tile data 423, output feature map tile data 426, and weight tile data 428. Accelerator 420 also includes at least one conventional convolution module 422 and at least one depth-wise convolution module. The modules of accelerator 420 may be groups of logic gates arranged to perform specific functions. The on-chip memories of accelerator 420 may be RAM, flash memory, or other embedded writable memory.

Accelerator 420 communicates with an external memory 430 at a bandwidth divided into input bandwidth allocation ($I_b$) 432, weight bandwidth allocation ($W_b$) 434, and output bandwidth allocation ($O_b$) 436. External memory 430 includes input feature map (IFM) data 442, filter data 443, weight data 444, and output feature map (OFM) data 446.

The hardware efficiency is not only related to the neural architecture but also the hardware resources and the accelerator design. In this embodiment, the FPGA fp used as accelerator 420 has 3 attributes: the size of on-chip memory $mem_{fp}$, the number of computing resources (e.g., DSPs) $comp_{fp}$, and the bandwidth between external memory 430 and the on-chip memories 423, 426, and 428 $BW_{fp}$.

The design of accelerator 420 is within all resource constraints of the FPGA. The design of accelerator 420 is composed of two parts: the design of the computing subsystem and the design of the communication subsystem. As the basic operators o in architecture A are conducted in nested loops, the loop optimizations, in particular the loop tiling, may be used in the design of the computing subsystem. In addition, with the consideration of a large amount of data (i.e., intermediate data and weight data), and a limited on-chip memory capacity, it may be infeasible to put all of the data on the FPGA. Therefore, data is moved between external memory 430 and on-chip memories 423, 426, and 428. As such, input bandwidth allocation ($I_b$) 432, weight bandwidth allocation ($W_b$) 434, and output bandwidth allocation ($O_b$) 436 are included in the latency model, and determined during hardware and neural architecture co-search.

As shown in conventional convolution module, conventional convolution involves $T_m \times T_n$ multiplication-and-addition (MAC) operations. For 16-bit data, each MAC needs one DSP. In addition, to consume all data in on-chip memories 423, 426, and 428, computations need to be repeated $K \cdot K \cdot T_r \cdot T_c$ times, and the pipeline initial interval (II) optimized to one cycle, where K is the size of the filter. These conditions would result in the following constraints on computing resources and latency:

$$T_m \times T_n \leq \mathbb{D}, \qquad \text{EQ. 1}$$

where $\mathbb{D}$ represents the number of DSPs in the FPGA, and $$tComp = K \cdot K \cdot T_r \cdot T_c \times 1, \qquad \text{EQ. 2}$$

where tComp is the latency of computation for all data provided by the on-chip memory.

The total size of on-chip memories 423, 426, and 428 is limited by $\mathbb{B}$. Among the three types of data transferred between external memory 430 and accelerator 420: IFM data 442, OFM data 446, and weight data 444, the size of the on-chip memory for each type of data, denoted as bI, bO, and bW, can be determined from external memory 430. The size of one on-chip buffer (BRAM) is limited, for example to 18K per on-chip buffer for the ZCU102 FPGA. Dimensions of data that need to be accessed in parallel, for example channels of IFM data 442, shown as $T_n$, must be placed in different BRAMs. Hence, the amount of data without a parallel requirement, shown as $T_r$ and $T_c$ in IFM data 442, is divided by 18K. Finally, the size of the on-chip buffer is equal to 2 times the tile size, where 2 indicates the double buffer utilized to hide communication by computation. This results in the following constraints:

$$bI = 2 \times T_n \times \lceil T_r \cdot T_c \cdot \text{bit}_I / 18K \rceil \qquad \text{EQ. 3}$$

$$bO = 2 \times T_m \times \lceil T_r \cdot T_c \cdot \text{bit}_O / 18K \rceil \qquad \text{EQ. 4}$$

$$bW = 2 \times T_m \times T_n \times \lceil K \cdot K \cdot \text{bit}_W / 18K \rceil \qquad \text{EQ. 5}$$

$$bI + bO + bW \leq \mathbb{B} \qquad \text{EQ. 6}$$

where $\text{bit}_I$, $\text{bit}_W$, and $\text{bit}_O$ are the bit-widths of the data type used for IFM data 442, weight data 444, and OFM data 446, respectively, and $\mathbb{B}$ is the maximum bandwidth.

Based on the buffer sizes and the bandwidth, $I_b$ 432, $W_b$ 434, and $O_b$ 436, allocated for each type of data buffer, the communication latency, tImem, tWmem, and tOmem, can be derived as follows:

$$tI_{mem} = \lceil T_n \cdot T_r \cdot T_c \cdot \text{bit}_I / I_b \rceil \qquad \text{EQ. 7}$$

$$tW_{mem} = \lceil T_m \cdot T_n \cdot K \cdot K \cdot \text{bit}_W / W_b \rceil \qquad \text{EQ. 8}$$

$$tO_{mem} = \lceil T_m \cdot T_r \cdot \text{bit}_O \cdot T_c / O_b \rceil \qquad \text{EQ. 9}$$

$$I_b + W_b + O_b \leq \mathbb{W} \qquad \text{EQ. 10}$$

where $\mathbb{W}$ is the maximum bandwidth between external memory 542 and accelerator 530.

Based on the foregoing formulations, a latency model may be derived. If M, N, R, and C represent the number of OFM channels, IFM channels, rows, and columns of the convolution layer, respectively, then the following latency models are derived.

$$Lat_1 = \max\{tComp, tI_{mem}, tW_{mem}\} \qquad \text{EQ. 11}$$

$$Lat_2 = \max\left\{\left\lceil \frac{N}{T_n} \right\rceil \cdot Lat_1, tO_{mem}\right\} \qquad \text{EQ. 12}$$

$$Lat = \left\lceil \frac{R}{T_r} \right\rceil \times \left\lceil \frac{C}{T_c} \right\rceil \times \left\lceil \frac{M}{T_m} \right\rceil \times Lat_2 + (tO_{mem} + Lat_1) \qquad \text{EQ. 13}$$

Since OFM 446 data is reused, it will remain in the on-chip memory 426 until being flushed to off-chip memory for every $$\left\lceil \frac{N}{T_n} \right\rceil$$

times that IFM data 442 and weight data 444 is loaded. $Lat_1$ indicates the latency of one round of computation, loading IFM data 442, and loading weight data 444, and $Lat_2$ indicates the latency of one round of OFM data 446 being flushed to external memory 430. For one layer, OFM tile data stored in on-chip memory 426 is flushed to external memory 430 each of $$B \times \left\lceil \frac{R}{T_r} \right\rceil \times \left\lceil \frac{C}{T_c} \right\rceil \times \left\lceil \frac{M}{T_m} \right\rceil$$

batches, yielding the total latency Lat for one layer. In this manner, the plurality of hyper-parameters of the latency model includes a tiling design and a bandwidth allocation during performance of inference of the neural architecture by the accelerator.

For the latency model of depthwise convolution, $T_m$ in the foregoing formulas is modified to be $T_m(d)$ and $T_n$ simply becomes 1. Where the batch size is 1 (B=1), the communication subsystem (including on-chip memory model EQS. 3 to 6, and external memory access model EQS. 7 to 9) of two types of convolutions are shared. However, the accelerators are independent, and therefore EQ. 1 can be revised as follows.

$$T_m \times T_n + T_m(d) \leq \mathbb{D} \qquad \text{EQ. 14}$$

At S312, an expanding section, such as the determining section or a sub-section thereof, expands the latency model to include compression techniques and any applicable accuracy increasing techniques.

Figure 5:
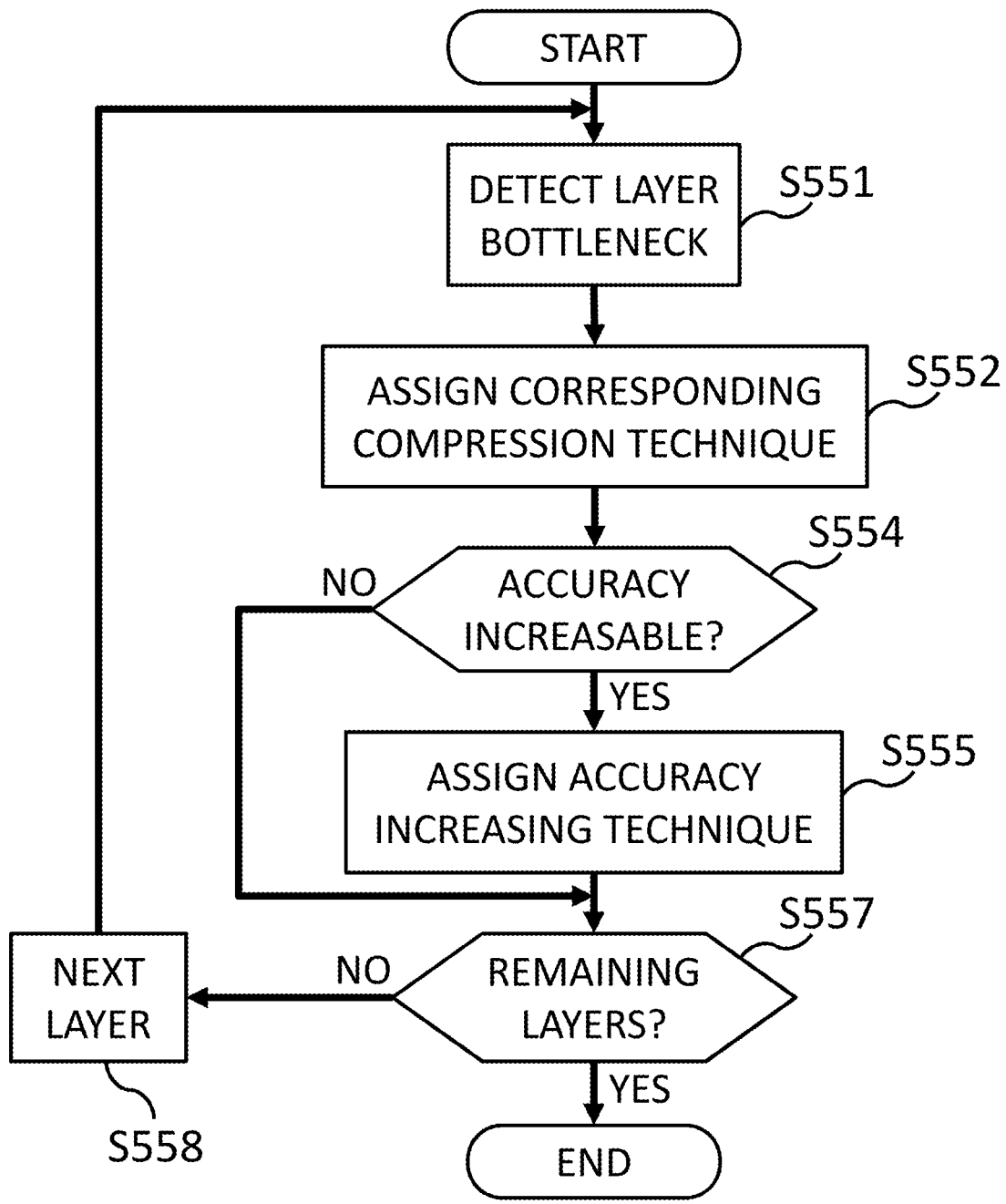
FIG. 5 shows an operational flow for expanding a latency model, according to an embodiment of the present invention.

FIG. 5 shows an operational flow for expanding a latency model, such as S312 in FIG. 3, according to an embodiment of the present invention. The operations within this operational flow may be performed by an expanding section or a correspondingly named sub-section thereof. As described in FIG. 3, the latency model is determined prior to expanding the latency model.

At S551, a detecting section, such as the expanding section or a sub-section thereof, detects a latency bottleneck in a layer of the neural architecture according to the latency model of the neural architecture, such as the latency model determined at S311 of FIG. 3. Before determining how to expand the latency model, the expanding section may detect the performance bottleneck of a layer, such as the latency factor associated with the greatest latency. To detect the latency bottleneck, the latency model may be broken down into multiple latency factors per layer. In some embodiments, each of these latency factors may already be seen in the latency model, and can be derived therefrom. For latency models as defined by EQ. 13, the determining the latency model further includes detecting, for each layer, a latency bottleneck among four latency factors. The first latency factor is the latency associated with copying activation data from an external memory to an internal memory of the accelerator. The second latency factor is the latency associated with copying weight values from the external memory to the internal memory. The third latency factor is the latency associated with performing computations on the activation data. The fourth latency factor is the latency associated with copying the activation data from the internal memory to the external memory. In this embodiment, the detecting section determines latency factors for one layer at one instance of S551.

Given a layer and associated hyper-parameters, the detecting section can detect the latency bottlenecks by considering $Lat_1$ and $Lat_2$ as described above. If $Lat_2$ is dominated by $tO_{mem}$, then the latency bottleneck is in transmitting OFM data, which is copying activation data from the internal memory of the accelerator to the external memory. Otherwise, the latency bottleneck will be determined from $Lat_1$. If $Lat_1$ is dominated by $tI_{mem}$, then the latency bottleneck is in transmitting IFM data, which is copying activation data from the external memory to the internal memory of the accelerator. If $Lat_1$ is dominated by $tWmem$, then the latency bottleneck is in transmitting weights, which is copying weight values from the external memory to the internal memory. If $Lat_1$ is dominated by $tComp$, then the involved computation resources of the accelerator are being fully utilized, which is to say that performing computations on the activation data is the latency bottleneck. Once the latency bottleneck of the layer is detected, the expanding section can assign compression techniques and/or accuracy-increasing techniques based on the latency bottleneck.

At S552, an assigning section, such as an expanding section or a sub-section thereof, assigns a compression technique to the layer corresponding to the latency bottleneck of the layer. Assigning a compression technique may include determining which hyper-parameter among the plurality of hyper-parameters in the latency model can be modified to reduce the latency, and to what extent the hyper-parameter can be modified. In other words, determining the latency model may further include assigning, for at least one layer of the selected neural architecture, a latency-decreasing technique corresponding to the latency bottleneck, each latency-decreasing technique associated with a hyper-parameter among the plurality of hyper-parameters and a range. There are many compression techniques, but not all of them will be effective in reducing latency. However, knowing the latency bottleneck may help determine which compression techniques will be effective for the layer. In the following examples, compression techniques of pattern pruning, channel cutting, and quantization will be introduced.

Pattern pruning is a compression technique in which the filter in the neural architecture A is pruned. A pattern is defined as a mask matrix Mat[x][y]. Mat[x][y]=0 indicates that the weights at position ⟨x, y⟩ will be pruned, while Mat[x][y]=1 indicates that the weights will remain. According to the number of zeros in Mat[x][y], the pattern can be classified into different categories of $PAT_c$, where c indicates the number of zeros in the pattern. Pattern pruning is a technique that can reduce latency. However, applying patterns to layers whose performance bottleneck is at communication will not help in reducing latency and may reduce accuracy.

Figure 6:
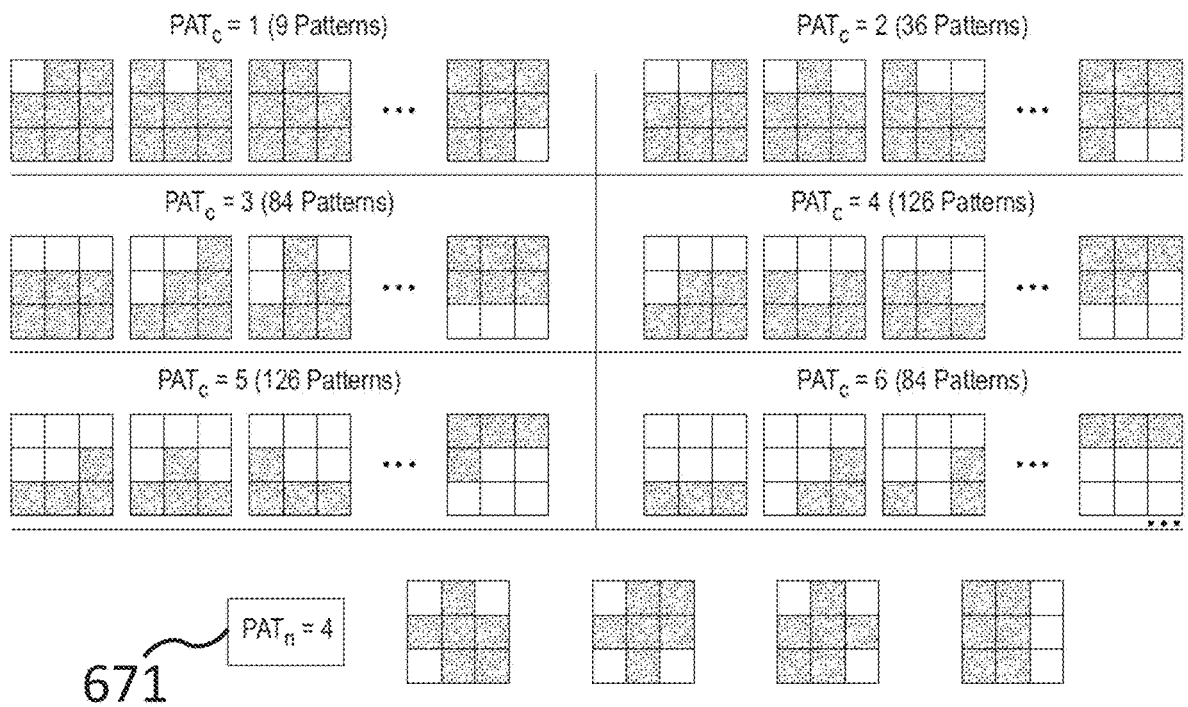
FIG. 6 shows exemplary patterns for pattern pruning, according to an embodiment of the present invention.

FIG. 6 shows exemplary patterns for pattern pruning, according to an embodiment of the present invention. Among all patterns, one category of $PAT_c$ will be selected for pruning. Each pattern category is further composed of many patterns. For instance, there are 84 potential patterns in the category of $PAT_c=3$. For neural architecture inference on the accelerator, applying certain patterns may result in a large number of multiplexers, making the design inefficient. Therefore, a limited number of patterns are selected from the selected category, denoted as $PAT_n$. In FIG. 6, the example of the pattern pruning space for a 3×3 filter, $PAT_n=4$ patterns are selected from the category of $PAT_c=3$, which includes a total of 84 candidates. Thus, compression technique 671 is $PAT_n=4$ patterns.

The selected patterns will be applied for a set of filters. The number of kernels pruned by each type of pattern is coupled with the tiling factors $T_m$ and $T_n$. As shown in FIG. 4, the data movement from on-chip memory of weight tile data 428 to conventional convolution module 422 is conducted in a pixel-wise manner. As a result, K×K iterations are performed to traverse the whole filter. To realize latency reduction, all patterns in one data tile must be the same. As such, the pruned weights in the outer loop can be skipped to reduce the computation time. In terms of the effect on the latency model, EQ. 2 can be modified as follows.

$$tComp = (K \cdot K - PAT_n) \cdot T_r \cdot T_c \qquad \text{EQ. 15}$$

where $PAT_n$ is the number of zeros in the pattern mask.

As demonstrated in EQ. 12, by applying the Euclidean norm, one pattern can be specified for each kernel in a filter, i.e., the determination of p(f$_i$) in neural architecture A. Since the pattern selection for kernels is based on the Euclidean norm, different patterns may be selected for data tiles of the same type. However, when implementing pattern pruning on an accelerator, if multiple types of patterns in a tile are applied, it will break the execution pipeline and the pattern pruning cannot improve performance at all. Reordering the input feature maps may solve this problem.

Figure 7:
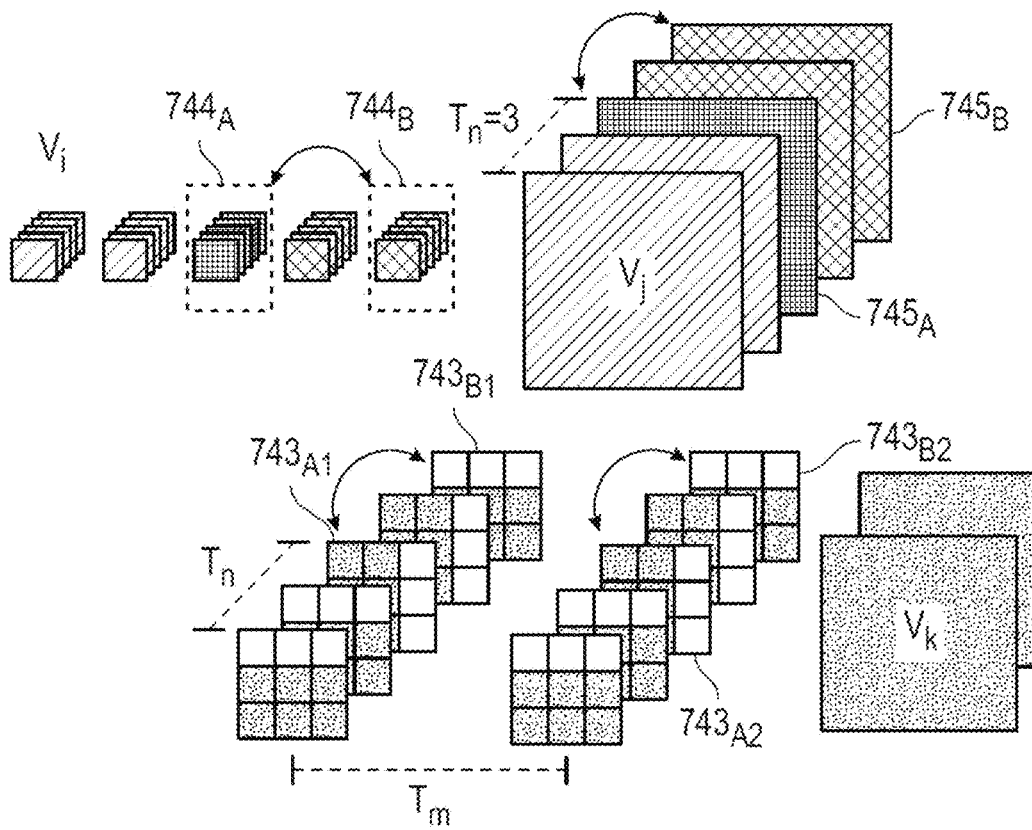
FIG. 7 shows a diagram of input feature map reordering to realize latency reduction from pattern pruning, according to another embodiment of the present invention.

FIG. 7 shows a diagram of input feature map reordering to realize latency reduction from pattern pruning, according to another embodiment of the present invention. Input feature map reordering may be useful in avoiding breaking the execution pipeline.

As shown in FIG. 7, the third channel, including filter 743$_{A1}$ and filter 743$_{A2}$, and fifth channel, including filter 743$_{B1}$ and filter 743$_{B2}$, used in the operator o$_{j,k}$ are switched. Correspondingly, feature map 745$_A$ and feature map 745$_B$ in node v$_j$ are switched. This will also affect the operator from v$_i$ to v$_j$, requiring switching of the third filter of weights 744$_A$ and the fifth filter of weights 744$_B$. In this way, the reduction in computation latency from the pattern pruning can take effect.

From EQ. 5 and EQ. 8, it may appear that pattern pruning can also reduce the on-chip buffer size and latency of loading weights. However, in most embodiments, for buffer size, all layers reuse this buffer, and therefore the size cannot be specialized for one layer, and for loading weights, pattern pruning will lead the loading procedure from sequential memory access to random access, resulting in potential for latency increase. Therefore, sequential memory access may be maintained so as not to hinder performance.

Channel cutting is another compression technique. Unlike pattern pruning, which changes the structure, channel cutting will not change the neural architecture.

Figure 8:
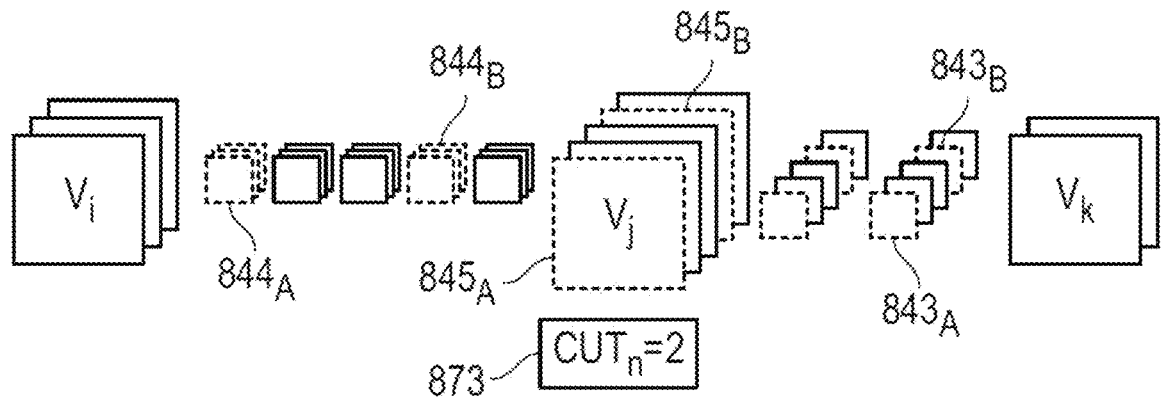
FIG. 8 shows a diagram of channel cutting, according to an embodiment of the present invention.

FIG. 8 shows a diagram of channel cutting, according to an embodiment of the present invention. Channel cutting directly reduces the number of channels of feature maps in a node, and it can potentially reduce the latency. In this embodiment, channel cutting modifies the number of channels for a node v$_i \in$ V in architecture A. CUT$_n$ represents the number of channels to be cut off from the feature maps of node v$_i$. When v$_i$ acts as the IFM for an operator, EQ. 12 is modified as follows:

$$Lat_2 = \max\left\{\left\lceil\frac{N - CUT_n}{T_n}\right\rceil \cdot Lat_1, tO_{mem}\right\} \quad \text{EQ. 16}$$

Then, when v$_i$ acts as the output feature maps for an operator, we revise EQ. 13 as follows:

$$Lat = \left\lceil\frac{R}{T_r}\right\rceil \times \left\lceil\frac{C}{T_c}\right\rceil \times \left\lceil\frac{M - CUT_n}{T_m}\right\rceil \times Lat_2 + (tO_{mem} + Lat_1) \quad \text{EQ. 17}$$

In this embodiment, CUT$_n$=2 channels are cut. Thus, compression technique 873 is CUT$_n$=2 channels. There are three consecutive nodes vi→vj→vk, and channel cutting is applied to v$_j$. In this figure, the channels of feature map 845$_A$ and feature map 845$_B$ in v$_j$ are cut off. By cutting off those channels, a ripple effect is taken to filters of f$_{i \rightarrow j}$, such as filter 844$_A$ and filter 844$_B$ and filters of f$_{j \rightarrow k}$, such as filter 843$_A$ and filter 843$_B$. However, as the channel pruning may easily result in accuracy reduction, since features are directly removed, the compression technique of channel cutting is carefully formulated, and, at least in some embodiments, may only be used only if the latency bottleneck cannot be alleviated by other compression techniques, such as the other compression techniques described herein.

Channel pruning can reduce the latency of a layer if and only if:

$$(1) \left\lceil\frac{M - CUT_n}{T_m}\right\rceil \leq \left\lceil\frac{M}{T_m}\right\rceil; \text{OR} \quad \text{EQ. 18}$$

$$(2) \left\lceil\frac{N - CUT_n}{T_n}\right\rceil < \left\lceil\frac{N}{T_n}\right\rceil; \text{AND} \quad \text{EQ. 19}$$

Lat$_2$ is not dominated by tO$_{mem}$, which is copying activation data from the internal memory of the accelerator to the external memory. This property indicates that pruning a small number of channels may not reduce latency. As such, this property can be used as a guide on the latency model to take T$_m$ or T$_n$ as the step.

Quantization is another compression technique. Quantization is widely used in FPGA implementations of neural architecture inference. However, quantization cannot alleviate specific types of performance bottlenecks.

Figure 9:
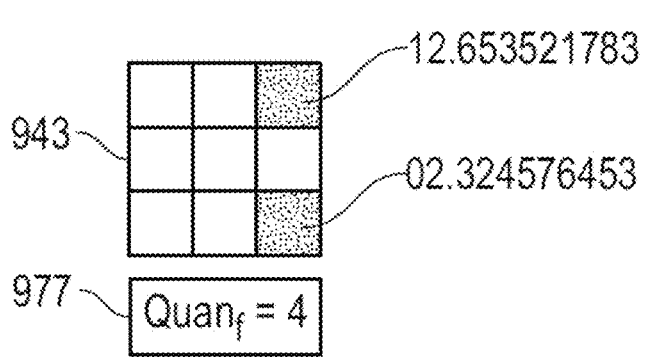
FIG. 9 shows a diagram of kernel expansion, according to an embodiment of the present invention.

FIG. 9 shows a diagram of weight quantization, according to an embodiment of the present invention. In this embodiment, the original neural architecture applies the data type of 32-bit floating-point, yet this can be converted to the 16-bit fixed point without accuracy loss. Such a fixed point representation is composed of two parts, the integer and fraction parts represented by ⟨I, F⟩. For a given pre-trained neural architecture A, the expanding section may obtain the maximum and minimum parameters of one operator. Then, the expanding section may analyze the number of bits required by integer part I. Since the integer part includes the most-significant bits, its bit-width will be maintained, further squeezing the fraction part F only, denoted as Quan$_f$ as shown in FIG. 9. In this embodiment, the compression technique 977 is Quan$_f$=4.

Hybrid quantization has potential to reduce latency where weights in different layers have different bit-widths. As can be seen from EQ. 8, quantization has potential to reduce the latency of loading weights. This can be implemented by composing multiple weights into one package. As with computing latency, since the initial interval is already optimized to 1 cycle, as shown in EQ. 15, lower bit-width operations cannot further reduce clock cycles. Lower bit-width operations can reduce the number of computing resources and have the potential to increase clock frequency. However, in an end-to-end implementation, the computing engine is shared by all layers. Therefore, the layer with the largest bit-width will dominate the design performance. In other words, quantization on a single layer can reduce latency of loading weights, but it may not reduce the computation latency if there exists another layer with a larger bit-width.

At S554, the expanding section or a sub-section thereof determines whether or not there are any techniques that are suitable for increasing the accuracy of the layer. If there is such a suitable accuracy-increasing technique, then the operational flow proceeds to S555 to assign an accuracy-increasing technique. If there is no such suitable accuracy-increasing technique, then the operational flow proceeds to S557 to determine if there are any remaining layers in the neural architecture.

At S555, the assigning section assigns an accuracy-increasing technique to the layer. Assigning an accuracy-increasing technique may include determining which hyperparameter among the plurality of hyper-parameters in the latency model can be modified to increase the accuracy, and to what extent the hyper-parameter can be modified. Unlike assigning compression techniques, which may correspond to the latency bottleneck, accuracy-increasing techniques have potential to increase latency, and therefore may be applied to other latency factors. In other words, determining the latency model may further include assigning, for at least one layer of the selected neural architecture, an accuracy-increasing technique corresponding to any among the latency factors other than the latency bottleneck, each latency-decreasing technique associated with a hyper-parameter among the plurality of hyper-parameters and a range. There are many accuracy-increasing techniques, but not all of them will be effective in increasing accuracy or avoiding increase in latency. However, knowing the latency bottleneck may help determine which accuracy-increasing techniques will be effective for the layer. In the following example, an accuracy-increasing technique of kernel expansion will be introduced.

Filter expansion is a modification of hyper-parameters of only the neural architecture A. Use of filter expansion may be motivated because (1) many state-of-the-art neural architectures contain larger sized filters, and (2) for specific layers, the increase of filter sizes will not add latency overhead.

Figure 10:
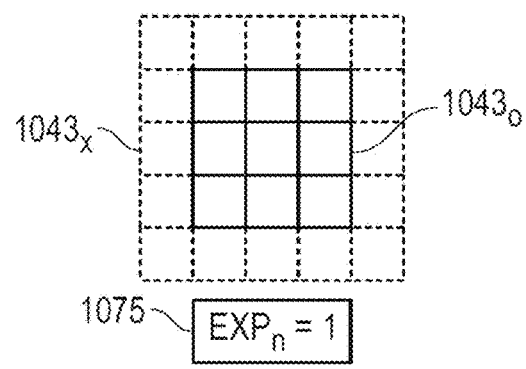
FIG. 10 shows a diagram of weight quantization, according to an embodiment of the present invention.

FIG. 10 shows a diagram of kernel expansion, according to an embodiment of the present invention. In this embodiment, $EXP_n$ is defined as the expansion factor on a filter. In this embodiment, original kernel filter 1043$_O$ is converted to expanded kernel filter 1043$_X$. Since the filter has been increased on all sides by one kernel, for accuracy-increasing technique 1075, $EXP_n=1$. Kernel expansion will impact the latency model by increasing K such that $K=2 \cdot EXP_n+K$.

The following theorem may guarantee that the accuracy will not be reduced by expaandng the kernel: Given a pre-trained neural network model A=⟨V, E, r, c, ch, o, f, para, acc⟩, for any operator $o_i$ on edge $e_i$, the expansion of filter $f_i$ by factor $EXP_n$ will not decrease the accuracy, if the initial weights of the newly added weights on $f_i$ are set to zero, and $o_i$ is padded by $EXP_n$, as shown in FIG. 10. The proof of this is straightforward, since all computations remain the same when we increase the kernel size and padding with extra zeros. With the guarantee of no accuracy loss, the expanded kernel makes it possible to increase accuracy with further training.

At S557, the expanding section or a sub-section thereof determines whether or not there are remaining layers in the neural architecture. If there are more layers in the neural architecture, then the operational flow selects the next layer (S558) before proceeding to another iteration of S551 to detect the latency bottleneck of the next layer. If there are no more layers in the neural architecture, then latency model for all of the layers is complete, and the operational flow ends.

At S313, a testing section, such as the determining section or a sub-section thereof, applies a Monte Carlo test to the latency model. In a Monte Carlo test, a sample of randomly generated hyper-parameters within the constraints of the latency model are input into the latency model to determine the resultant overall latency with those hyper-parameters. As iterations of S313 proceed, a generating section, such as the testing section or a sub-section thereof, may generate many samples for input to determine resultant latency statistics. In other words, the determining the overall latency may further include generating a plurality of unique combinations of values of the hyper-parameters in the latency model. The determining the overall latency may further include calculating, for each of the plurality of unique combinations of values of the hyper-parameters, a resultant latency. In most embodiments, the samples consist of completely randomized values of the hyper-parameters, without regard to any resultant latency of a previous Monte Carlo test.

At S314, the determining section or a sub-section thereof determines whether or not there are remaining samples for testing. If there are more untested samples, then the operational flow selects the next sample (S315) before proceeding to another iteration of S313 to apply a Monte Carlo test for the next sample. If there are no more untested samples, then the operational flow proceeds to S317, where the latency results are aggregated.

At S317, an aggregating section, such as the determining section, or a sub-section thereof, aggregates the latency results from the Monte Carlo tests. Statistics such as minimum latency, average latency, and maximum latency may be helpful in determining which neural architectures have potential to be the fastest and/or most accurate, and thus are suitable for hyper-parameter optimization through function approximation of the latency model.

At S318, the determining section or a sub-section thereof determines whether or not there are remaining neural architectures for overall latency determination. If there are more undetermined neural architectures, then the operational flow selects the next neural architecture (S319) before proceeding to another iteration of S311 to determine a latency model for the next neural architecture. If there are no more undetermined neural architectures, then the operational flow ends.

Before proceeding to optimization, in many embodiments a selecting section will select, from among the plurality of neural architectures in the model zoo, a subset of neural architectures that have potential to be the fastest and/or most accurate, based on the statistics of each neural architecture from aggregation of the results of the Monte Carlo tests. In some embodiments, only the minimum overall latency is used to select the subset of neural architectures. In other embodiments, selection may be based on the minimum and average.

At S160, the determining section determines the hyper-parameter values of any neural architectures deemed suitable for optimization. In some embodiments, the determining section applies a function approximator to the latency model to determine the hyper-parameter values. For example, the function approximator may be a recurrent neural architecture with reinforcement learning using a reward including a latency component and an accuracy component. In these embodiments, the determining section may determine values of the hyper-parameters of the latency model. In other embodiments, a brute force technique may be used to determine the hyper-parameter values. In some embodiments, the goal is to optimize the hyper-parameter values to minimize latency and maximize accuracy. In some embodiments, the goal is to maximize accuracy at or below a threshold latency value. In some embodiments, the hyper-parameter value determination at S160 is a simple importation of the sample used in the Monte Carlo test that resulted in the lowest latency, or the sample that resulted in the greatest accuracy with a latency of performance of inference that is lower than the threshold latency value.

Figure 11:
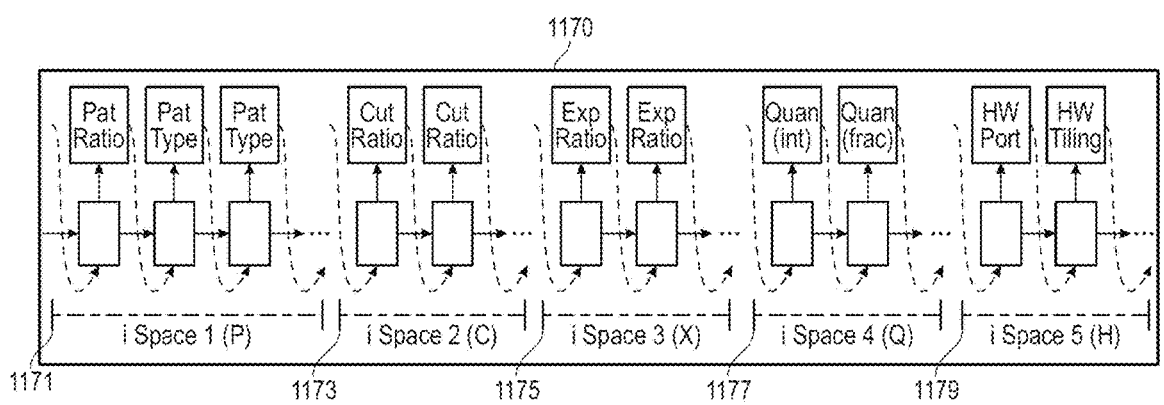
FIG. 11 shows a function approximator neural network for hyper-parameter optimization, according to an embodiment of the present invention.

FIG. 11 shows a function approximator neural network 1170 for hyper-parameter value optimization, according to an embodiment of the present invention. In this embodiment, neural network 1170 is a Long Short Term Memory (LSTM) Recurrent Neural Network (RNN) trained by reinforcement learning. More specifically, an RNN controller is composed of a softmax classifier to predict hyperparameter values for each of the assigned compression techniques, including pattern pruning hyperparameters 1171, channel cutting hyperparameters 1173, and quantization hyperparameters 1177, the assigned accuracy-increasing techniques, including kernel expansion hyperparameters 1175, and hardware design hyperparameters 1179, such as a tiling design and a bandwidth allocation, of each layer of the neural architecture. The predicted hyperparameter values will identify a specific neural architecture and hardware design, which can derive a reward in terms of accuracy and latency. The search process will optimize the controller by tuning its parameters $\theta_c$ to maximize the expectation of the reward. A policy gradient method will be employed to update parameters $\theta_c$, aiming to predict better architectures over a series of episodes.

Figure 12:
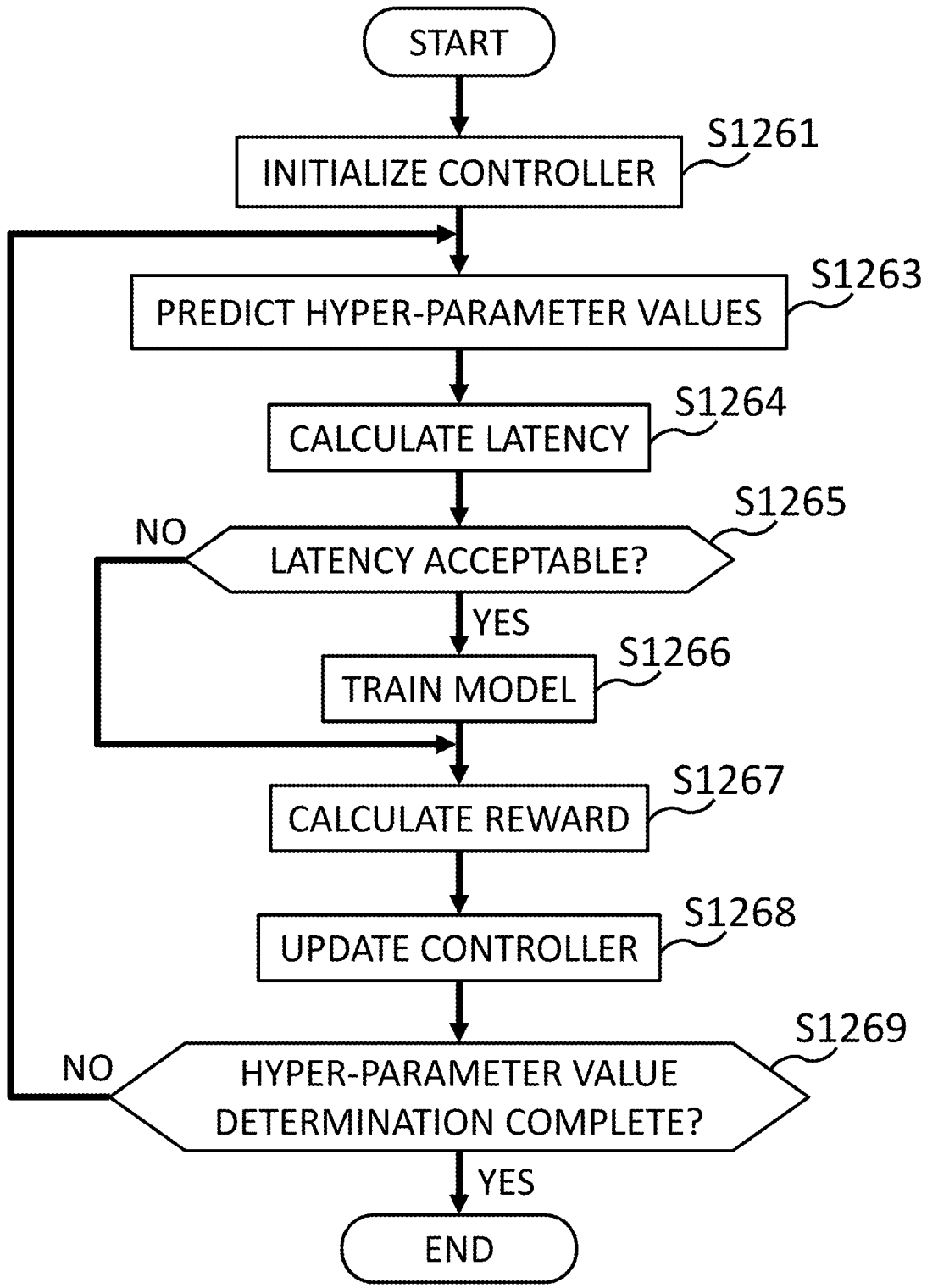
FIG. 12 shows an operational flow for determining modified hyper-parameters, according to another embodiment of the present invention.

FIG. 12 shows an operational flow for determining hyperparameter values, such as S160 in FIG. 1, according to an embodiment of the present invention. The operations within this operational flow may be performed by a determining section or a correspondingly named sub-section thereof. As described in FIG. 1, the latency model is determined and expanded before determining the hyper-parameter values.

In this embodiment, the hyper-parameters are determined using a function approximator neural network trained by reinforcement learning, such as the function approximator neural network 1170 in FIG. 11.

At S1261, an initializing section, such as the determining section or a sub-section thereof, initializes a controller of the function approximator neural network. Initialization may be achieved by assigning random values to the hyper-parameters to form the first input to the controller.

At S1263, a predicting section, such as the determining section or a sub-section thereof, predicts hyper-parameter values that will maximize a reward in terms of accuracy and latency. In the first iteration of S1263, the predicted hyper-parameter values are not expected to derive a high reward. However, as iterations of S1263 to S1268 proceed, the predicted hyper-parameter values at S1263 will derive higher and higher rewards. In each iteration, sometimes referred to as an episode, the predicted hyper-parameters can be regarded as actions. Based on the actions, an optimized neural architecture A and hardware design D may be derived. In order to update the controller for the next episode, a reward is computed according to the following procedures.

At S1264, a calculating section, such as the determining section or a sub-section thereof, calculates the latency of performance of neural architecture inference by an accelerator according to the hyper-parameter values predicted at S1263. The calculating section may simply input the hyper-parameter values into the latency model of each layer to calculate the overall latency. The calculating section calculates latency lat of neural architecture A on design D by using the latency model.

At S1265, the determining section determines whether the latency calculated from the predicted hyper-parameter values is acceptable. In some embodiments, acceptability of the latency is defined by a threshold latency value, sometimes referred to as a timing constraint. If the calculated latency is acceptable, then the operational flow proceeds to S1266, where the neural architecture undergoes limited training. If the calculated latency is not acceptable, then the operational flow proceeds to S1267, where the reward is calculated. In other words, the determining section verifies whether timing constraint T can be satisfied. If lat>T, then the reward is directly calculated without fine-tuning the neural architecture. Otherwise, the reward is calculated based on accuracy and latency.

At S1266, a training section, such as the determining section or a sub-section thereof, trains the neural architecture with a limited amount of training data. In some embodiments, the amount of training data is just enough to fine tune the neural architecture with the predicted hyper-parameters. Then, the training section uses a hold-out data set to test the accuracy of the neural network model. For example, the training section may fine-tune neural architecture A to obtain accuracy acc on the hold-out dataset. Since the neural network model is pre-trained, it is not necessary to train the neural network model from scratch. Instead, the training section may fine-tune the neural network model for a small number of data batches, such as β=10, to obtain acc. In other words, determining the values of the hyper-parameters of the latency model includes determining the accuracy component by training the neural architecture using a hold-out training data set. In other embodiments, β can be increased for finer tuning of the neural network model, which may lead to an increase in accuracy.

At S1267, the calculating section calculates a reward based on the calculated latency and resultant accuracy from the test after the limited training. The calculation of reward may be based on the following formula:

$$R(\text{acc},\text{lat}) = \alpha \times r_{acc} + (1-\alpha) \times r_{lat} \qquad \text{EQ. 20}$$

where $\alpha$ is a scaling parameter to control with the search is for higher accuracy (i.e., larger $\alpha$) or lower latency (i.e., smaller $\alpha$), If lat>T, indicating that the timing constraint cannot be satisfied, then the calculating section will set $r_{acc}=-1$ and $r_{lat}=T-\text{lat}$. Otherwise, the calculating section normalizes $r_{acc}$ and $r_{lat}$ to the range from $-1$ to $1$, as follows:

$$r_{acc} = \frac{acc - A_{min}}{A_{ori} - A_{min}} \times 2 - 1, \text{ and} \qquad \text{EQ. 21}$$

$$r_{lat} = \frac{T - lat}{T - T_{min}} \times 2 - 1, \qquad \text{EQ. 22}$$

where $A_{ori}$ is the original accuracy of the neural architecture, T is the timing constraint, $A_{min}$ and $T_{min}$ are the lower bounds on accuracy and latency, which are involved to improve normalization.

At S1268, an updating section, such as the determining section or a sub-section thereof, updates the parameters of the controller based on the reward. After the controller has predicted hyper-parameter values, and a reward R is calculated, the updating section may employ a Monte Carlo policy gradient algorithm to update the controller:

$$\nabla J(\theta) = \frac{1}{m} \sum_{k=1}^{m} \sum_{t=1}^{T} \gamma^{T-t} \nabla_\theta \log \pi_\theta(a_t | a_{(t-1):1})(R_k - b) \qquad \text{EQ. 23}$$

where m is the batch size and T is the number of steps in each episode. Rewards are discounted at every step by an exponential factor $\gamma$ and baseline b is the average exponential moving of rewards.

At S1269, the determining section or a sub-section thereof, determines whether the determination of hyperparameter values is complete. If the determination of hyperparameter values is not complete, then the operational flow returns to S1263, where the controller outputs predicted hyper-parameters for another iteration of S1263-S1268. If the determination of hyper-parameter values is complete, then the operational flow ends.

At S170, a selecting section selects a neural architecture. In some embodiments, the selecting section selects from among the neural architectures that have undergone hyper-parameter value determination at S160. In some embodiments, the selecting section selects, from among neural architectures within the plurality of neural architectures that have a latency of performance of inference that is lower than a threshold latency value, a neural architecture trained to perform the function with a greatest accuracy. In other embodiments, the selecting section selects from among all the neural architectures in the model zoo, such as when the hyper-parameter value determination at S160 is a simple importation of the sample used in the Monte Carlo test that resulted in the lowest latency, or the sample that resulted in the greatest accuracy with a latency of performance of inference that is lower than the threshold latency value.

In the foregoing embodiment, compared with the cold-start co-search, by starting with a model zoo of pre-trained neural network models, search time can be reduced from hundreds of GPU hours to less than 3 GPU hours for ImageNet and 20 GPU minutes for CIFAR-10 without proxy; while achieving accuracy comparable with the state-of-the-art neural network models. The embodiments of the present invention described herein may push forward the accuracy-latency Pareto frontier for different datasets, such as CIFAR-10 and ImageNet. In other words, strict latency constraints can be met while achieving similar accuracy with baseline, hardware agnostic, architectures.

Figure 13:
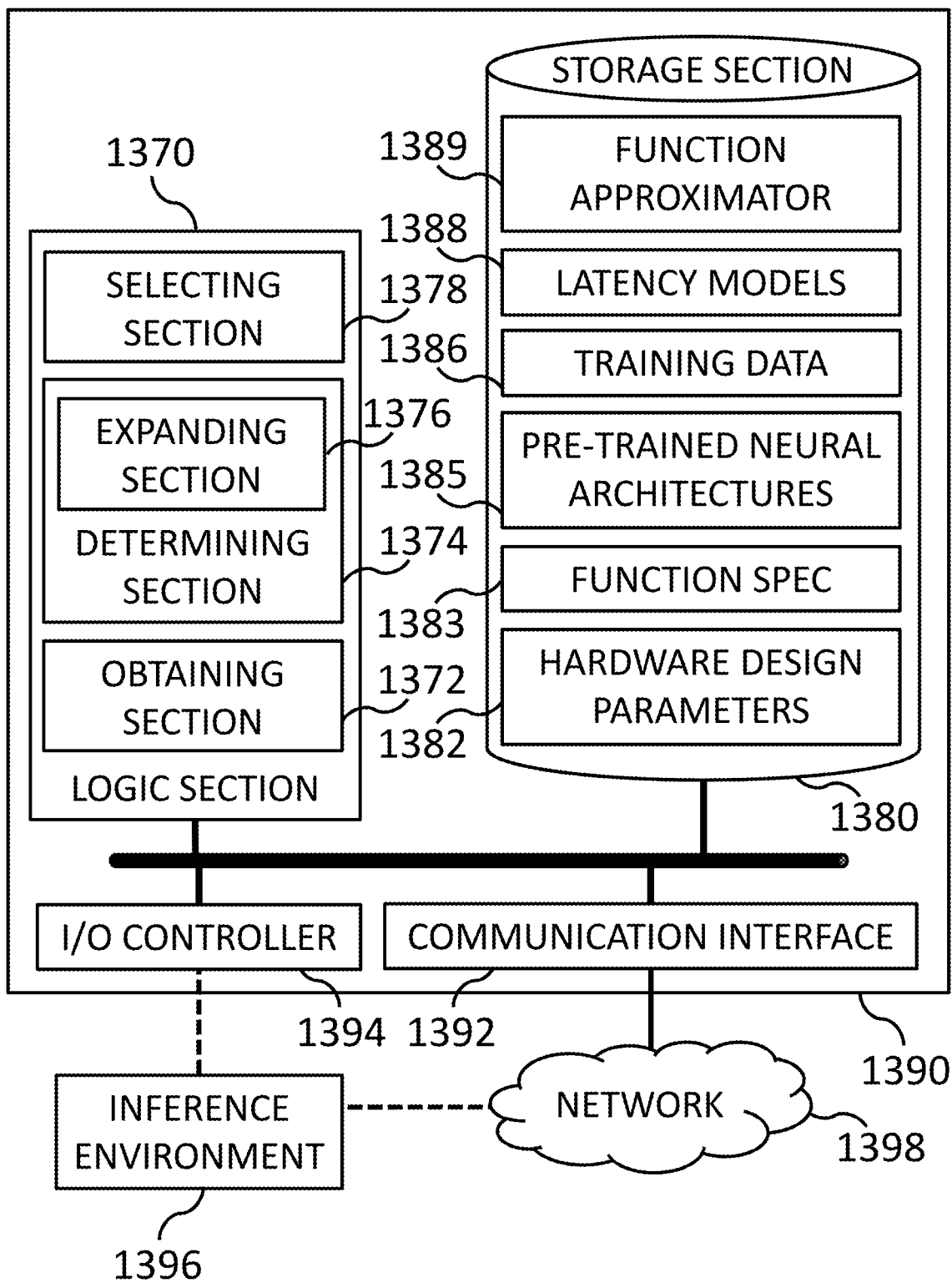
FIG. 13 shows a hardware configuration for hardware and neural architecture co-search, according to an embodiment of the present invention.

FIG. 13 shows a hardware configuration 1390 for hardware and neural architecture co-search, according to an embodiment of the present invention. The exemplary hardware configuration includes apparatus 1390, which communicates with network 1398, and interacts with inference environment 1396. Apparatus 1390 may be a host computer such as a server computer or a mainframe computer that executes an on-premise application and hosts client computers that use it, in which case apparatus 1390 may not be directly connected to inference environment 1396, but are connected through a terminal device through network 1398. Apparatus 1390 may be a computer system that includes two or more computers. Apparatus 1390 may be a personal computer that executes an application for a user of apparatus 1390.

Apparatus 1390 includes a logic section 1370, a storage section 1380, a communication interface 1392, and an input/output controller 1394. Logic section 1370 may be a computer program product including one or more computer readable storage mediums collectively storing program instructions that are executable by a processor or programmable circuitry to cause the processor or programmable circuitry to perform the operations of the various sections. Logic section 1370 may alternatively be analog or digital programmable circuitry, or any combination thereof. Logic section 1370 may be composed of physically separated storage or circuitry that interacts through communication. Storage section 1380 may be a non-volatile computer-readable medium capable of storing non-executable data for access by logic section 1370 during performance of the processes herein. Communication interface 1392 reads transmission data, which may be stored on a transmission buffering region provided in a recording medium, such as storage section 1380, and transmits the read transmission data to network 1398 or writes reception data received from network 1398 to a reception buffering region provided on the recording medium. Input/output controller 1394 connects to various input and output units, such as inference environment 1396, via a parallel port, a serial port, a keyboard port, a mouse port, a monitor port, and the like to accept commands and present information. Inference environment 1396 may be a hardware chip capable of performing neural architecture inference, such as an FPGA, or may be a computer or similar device with a processor and memory, such as a smartphone, smart car, etc., which also includes an FPGA in communication with the memory.

Logic section 1370 includes obtaining section 1372, determining section 1374, which includes expanding section 1376, and selecting section 1378. Storage section 1380 includes hardware design parameters 1382, function specification 1383, pre-trained neural architectures candidates 1385, training data 1386, latency models 1388, and a function approximator 1389.

Obtaining section 1372 is the portion of logic section 1370 that obtains information for hardware and neural architecture co-search. For example, obtaining section 1372 may be configured to obtain a function specification and hardware design parameters. Obtaining section 1372 may store obtained information in storage section 1380 as hardware design parameters 1382 and function specification 1383. Obtaining section 1372 may include sub-sections for performing additional functions, as described in the foregoing flow charts. Such sub-sections may be referred to by a name associated with their function.

Determining section 1374 is the portion of logic section 1370 that makes various determinations for hardware and neural architecture co-search, such as latency, latency models, hyper-parameter values, etc. While determining, determining section 1374 may access hardware design parameters 1382, training data 1386, latency models 1388, and function approximator 1389. Determining section 1374 may include sub-sections for performing additional functions, as described in the foregoing flow charts. Such sub-sections may be referred to by a name associated with their function.

Expanding section 1375 is the portion of logic section 1370 that expands a latency model to include compression techniques and/or accuracy increasing techniques. While expanding, expanding section 1375 may access latency models 1388. Expanding section 1375 may include sub-sections for performing additional functions, as described in the foregoing flow charts. Such sub-sections may be referred to by a name associated with their function.

Selecting section 1377 is the portion of logic section 1370 that selects neural architectures during hardware and neural architecture co-search. For example, selecting section 1377 may be configured to select neural architectures that are suitable for hyper-parameter value determination, and/or select a final neural architecture. While selecting, selecting section 1377 may access latency models 1388, and function approximator 1389. Selecting section 1377 may include sub-sections for performing additional functions, as described in the foregoing flow charts. Such sub-sections may be referred to by a name associated with their function.

In other embodiments, the apparatus may be any other device capable of processing logical functions in order to perform the processes herein. The apparatus may not need to be connected to a network in environments where the input, output, and all information is directly connected. The logic section and the storage section need not be entirely separate devices, but may share one or more computer-readable mediums. For example, the storage section may be a hard drive storing both the computer-executable instructions and the data accessed by the logic section, and the logic section may be a combination of a central processing unit (CPU) and random access memory (RAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-readable medium including instructions recorded thereon that are executable by a computer to cause the computer to perform operations comprising:

obtaining a specification of a function and a plurality of hardware design parameters of an accelerator, the hardware design parameters including a memory capacity of the accelerator, a number of computational resources of the accelerator, a communication bandwidth between the accelerator and an external memory, and a template configuration of the accelerator;

determining, for a neural architecture including weight values that have been trained to perform the function with an accuracy, a latency model for determining an overall latency of an inference process of the neural architecture by the accelerator within the hardware design parameters, wherein the inference process is performed by the accelerator applying the weight values of the neural architecture to input values according to computations of the neural architecture to produce output values while interfacing with the external memory to transfer the input values, the weight values, and the output values, the latency model including a first plurality of hardware design hyper-parameters constrained by the hardware design parameters and a second plurality of neural architecture hyper-parameters constrained by the neural architecture, the first plurality of hardware design hyper-parameters including allocations of the communication bandwidth during the performance of inference;

detecting, by analyzing the latency model, a computational resource latency bottleneck in a first layer of the neural architecture, the computational resource latency bottleneck indicating that the number of computational resources of the accelerator are fully utilized during the performance of inference of the first layer, and a communication bandwidth latency bottleneck in a second layer of the neural architecture, the communication bandwidth latency bottleneck indicating that utilization of the number of computational resources of the accelerator is limited by the communication bandwidth in transferring the input values, the weight values, and the output values during the inference process of the second layer;

expanding the latency model for the second layer of the neural architecture by increasing a range of an assigned hyper-parameter among the second plurality of neural architecture hyper-parameters constrained by the neural architecture in response to detecting the communication bandwidth latency bottleneck in the second layer; and determining a value of the assigned hyper-parameter that reduces the overall latency of the inference process or increases the accuracy in the inference process.

2. The computer-readable medium of claim 1, wherein the second plurality of neural architecture hyper-parameters further include a tiling design during the inference process.

3. The computer-readable medium of claim 1, wherein the detecting further includes:

detecting whether, during the inference process of the second layer, utilization of the number of computational resources of the accelerator is limited by:
the communication bandwidth in transferring the input values from the external memory to the accelerator,
the communication bandwidth in transferring the weight values from the external memory to the accelerator, or
the communication bandwidth in transferring the output values from the accelerator to the external memory.

4. The computer-readable medium of claim 3, wherein the assigned hyper-parameter represents a number of channels, and the range is increased to include fewer channels than constrained by the neural architecture in response to detecting that, during the inference process of the second layer, utilization of the number of computational resources of the accelerator is limited by the communication bandwidth in transferring the input values from the external memory to the accelerator.

5. The computer-readable medium of claim 4, wherein the assigned hyper-parameter represents a weight value bit-width, and the range is increased to include smaller bit-widths than constrained by the neural architecture in response to detecting that, during the inference process of the second layer, utilization of the number of computational resources of the accelerator is limited by the communication bandwidth in transferring the weight values from the external memory to the accelerator.

6. The computer-readable medium of claim 5, wherein the determining the overall latency further includes:

generating a plurality of unique combinations of values of the first plurality of hardware design hyper-parameters constrained by the hardware design parameters and the second plurality of neural architecture hyper-parameters constrained by the neural architecture except for the assigned hyper-parameter, which is constrained by the range as increased by the expanding.

7. The computer-readable medium of claim 6, wherein the determining the overall latency further includes:

calculating, for each of the plurality of unique combinations of values of the first plurality of hardware design hyper-parameters and the second plurality of neural architecture hyper-parameters, a resultant latency.

8. The computer-readable medium of claim 5, further comprising:

determining values of the first plurality of hardware design hyper-parameters constrained by the hardware design parameters and the second plurality of neural architecture hyper-parameters constrained by the neural architecture except for the assigned hyper-parameter, which is constrained by the range as increased by the expanding.

9. The computer-readable medium of claim 8, wherein the determining the values of the first plurality of hardware design hyper-parameters and the second plurality of neural architecture hyper-parameters of the latency model includes:

applying a function approximator to the latency model.

10. The computer-readable medium of claim 9, wherein the function approximator is a recurrent neural network with reinforcement learning using a reward including a latency component and an accuracy component.

11. The computer-readable medium of claim 10, wherein the determining the values of the first plurality of hardware design hyper-parameters and the second plurality of neural architecture hyper-parameters of the latency model includes:

determining the accuracy component by training the neural architecture using a hold-out training data set.

12. The computer-readable medium of claim 3, wherein the assigned hyper-parameter represents a kernel size, and the range is increased to include larger kernels than constrained by the neural architecture in response to detecting that, during the inference process of the second layer, utilization of the number of computational resources of the accelerator is limited by the communication bandwidth in transferring the output values from the accelerator to the external memory.

13. A method comprising:

obtaining a specification of a function and a plurality of hardware design parameters of an accelerator, the hardware design parameters including a memory capacity of the accelerator, a number of computational resources of the accelerator, a communication bandwidth between the accelerator and an external memory, and a template configuration of the accelerator;

determining, for a neural architecture including weight values that have been trained to perform the function with an accuracy, a latency model for determining an overall latency of an inference process of the neural architecture by the accelerator within the hardware design parameters, wherein the inference process is performed by the accelerator applying the weight values of the neural architecture to input values according to computations of the neural architecture to produce output values while interfacing with the external memory to transfer the input values, the weight values, and the output values, the latency model including a first plurality of hardware design hyper-parameters constrained by the hardware design parameters and a second plurality of neural architecture hyper-parameters constrained by the neural architecture, the first plurality of hardware design hyper-parameters including allocations of the communication bandwidth during the performance of inference;

detecting, by analyzing the latency model, a computational resource latency bottleneck in a first layer of the neural architecture, the computational resource latency bottleneck indicating that the number of computational resources of the accelerator are fully utilized during the performance of inference of the first layer, and a communication bandwidth latency bottleneck in a second layer of the neural architecture, the communication bandwidth latency bottleneck indicating that utilization of the number of computational resources of the accelerator is limited by the communication bandwidth in transferring the input values, the weight values, and the output values during the inference process of the second layer;

expanding the latency model for the second layer of the neural architecture by increasing a range of an assigned hyper-parameter among the second plurality of neural architecture hyper-parameters constrained by the neural architecture in response to detecting the communication bandwidth latency bottleneck in the second layer; and determining a value of the assigned hyper-parameter that reduces the overall latency of the inference process or increases the accuracy in the inference process.

14. The method of claim 13, wherein the second plurality of neural architecture hyper-parameters further include a tiling design during the inference process.

15. The method of claim 14, wherein the detecting further includes:

detecting whether, during the inference process of the second layer, utilization of the number of computational resources of the accelerator is limited by:

the communication bandwidth in transferring the input values from the external memory to the accelerator, the communication bandwidth in transferring the weight values from the external memory to the accelerator, or the communication bandwidth in transferring the output values from the accelerator to the external memory.

16. The method of claim 15, wherein the assigned hyper-parameter represents a number of channels, and the range is increased to include fewer channels than constrained by the neural architecture in response to detecting that, during the inference process of the second layer, utilization of the number of computational resources of the accelerator is limited by the communication bandwidth in transferring the input values from the external memory to the accelerator.

17. The method of claim 16, wherein the assigned hyper-parameter represents a weight value bit-width, and the range is increased to include smaller bit-widths than constrained by the neural architecture in response to detecting that, during the inference process of the second layer, utilization of the number of computational resources of the accelerator is limited by the communication bandwidth in transferring the weight values from the external memory to the accelerator.

18. The method of claim 17, further comprising:

determining values of the first plurality of hardware design hyper-parameters constrained by the hardware design parameters and the second plurality of neural architecture hyper-parameters constrained by the neural architecture except for the assigned hyper-parameter, which is constrained by the range as increased by the expanding.

19. The method of claim 18, wherein the determining the values of the hyper-parameters of the latency model includes applying, to the latency model, a recurrent neural network with reinforcement learning using a reward including a latency component and an accuracy component.

20. An apparatus comprising:

an obtaining section configured to obtain a specification of a function and a plurality of hardware design parameters of an accelerator, the hardware design parameters including a memory capacity of the accelerator, a number of computational resources of the accelerator, a communication bandwidth between the accelerator and an external memory, and a template configuration of the accelerator;

a determining section configured to determine, for a neural architecture including weight values that have been trained to perform the function with an accuracy, a latency model for determining an overall latency of an inference process of the neural architecture by the accelerator within the hardware design parameters, wherein the inference process is performed by the accelerator applying the weight values of the neural architecture to input values according to computations of the neural architecture to produce output values while interfacing with the external memory to transfer the input values, the weight values, and the output values, the latency model including a first plurality of hardware design hyper-parameters constrained by the hardware design parameters and a second plurality of neural architecture hyper-parameters constrained by the neural architecture, the first plurality of hardware design hyper-parameters including allocations of the communication bandwidth during the performance of inference;

a detecting section configured to detect, by analyzing the latency model, a computational resource latency bottleneck in a first layer of the neural architecture, the computational resource latency bottleneck indicating that the number of computational resources of the accelerator are fully utilized during the performance of inference of the first layer, and a communication bandwidth latency bottleneck in a second layer of the neural architecture the communication bandwidth latency bottleneck indicating that utilization of the number of computational resources of the accelerator is limited by the communication bandwidth in transferring the input values, the weight values, and the output values during the inference process of the second layer;

an expanding section configured to expand the latency model for the second layer of the neural architecture by increasing a range of an assigned hyper-parameter among the second plurality of neural architecture hyper-parameters constrained by the neural architecture in response to detecting the communication bandwidth latency bottleneck in the second layer; and wherein the determining section is further configured to detect determine a value of the assigned hyper-parameter that reduces the overall latency of the inference process or increases the accuracy in the inference process.

\* \* \* \* \*